April 18, 1961 B. DE GORTER 2,980,301
METERING VALVE FOR AEROSOL CONTAINER
Filed Sept. 2, 1958 3 Sheets-Sheet 3
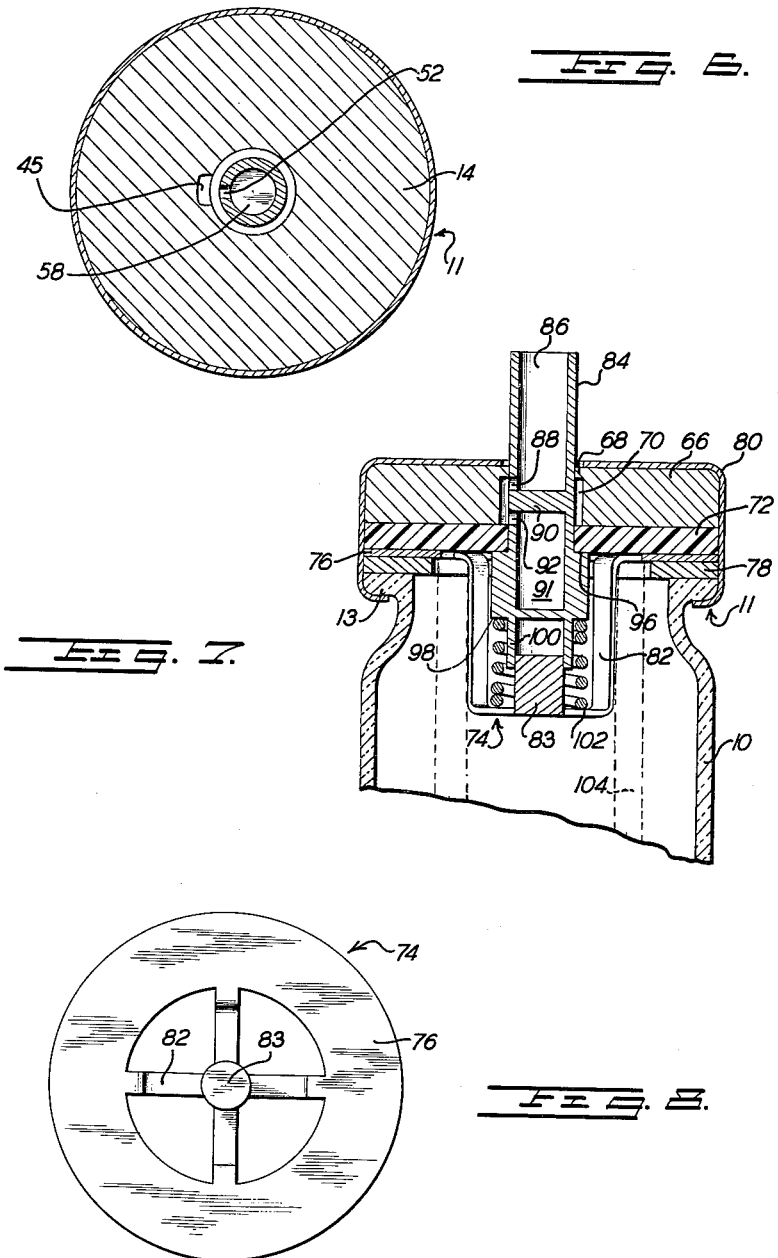
INVENTOR.
Benjamin de Gorter
BY United States Patent Office 2,980,301
Patented Apr. 18, 1961

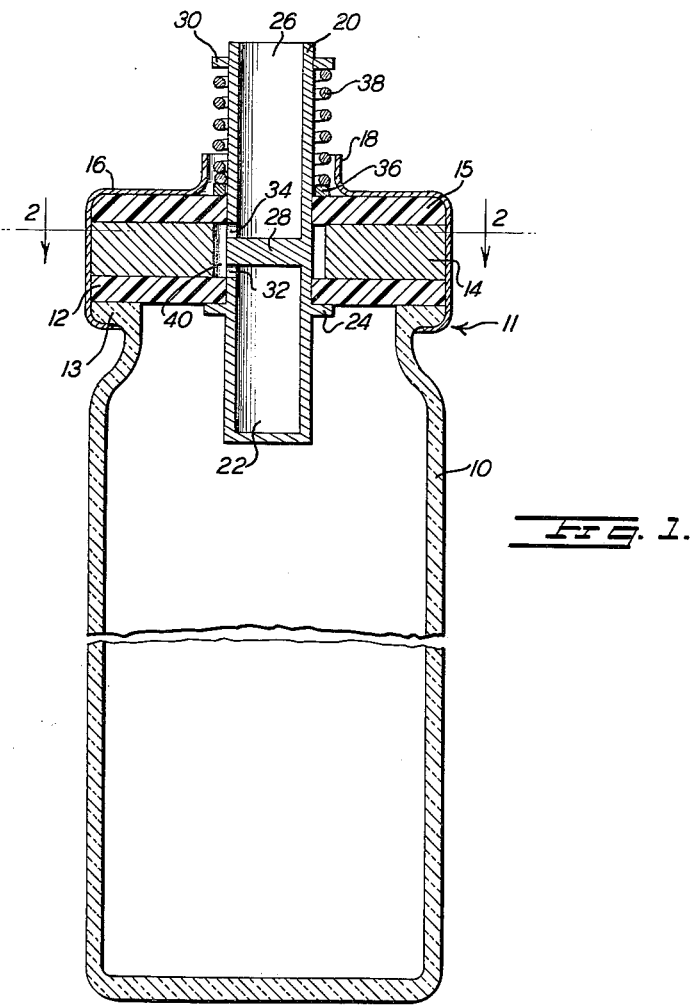
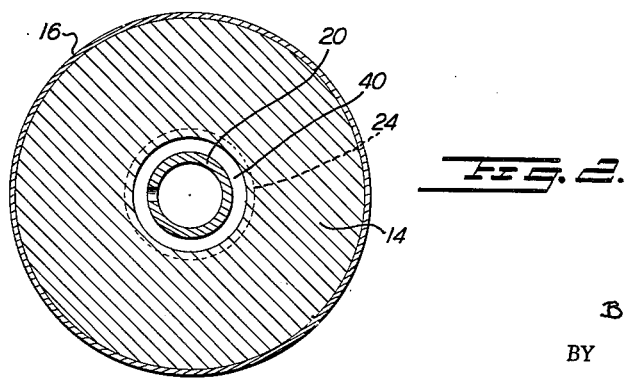
Fig. 1.
Fig. 2.
INVENTOR.
Benjamin de Gorter

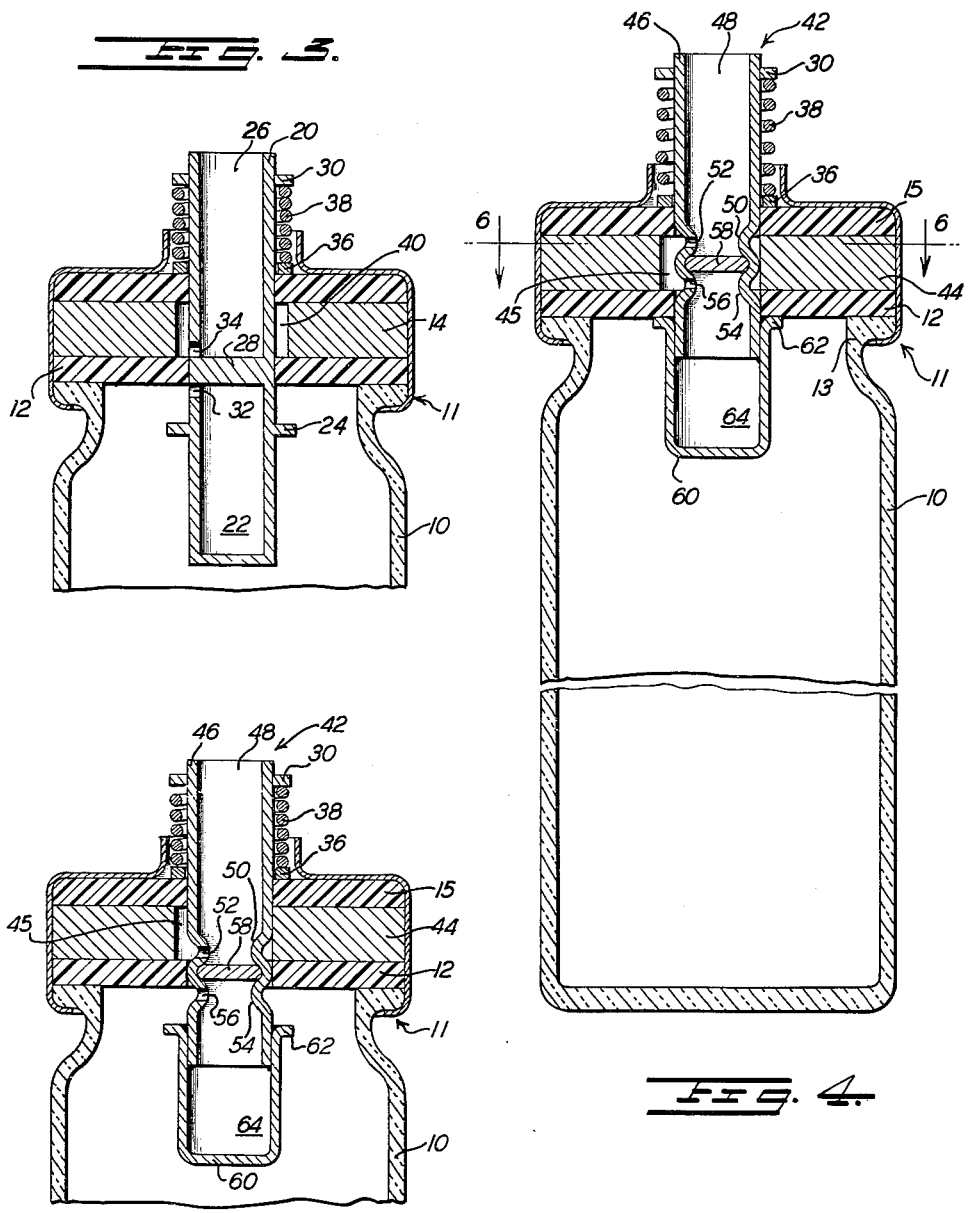

2,980,301

METERING VALVE FOR AEROSOL CONTAINER

Benjamin de Gorter, Los Angeles, Calif., assignor to Riker Laboratories, Inc., Los Angeles, Calif., a corporation of Delaware Filed Sept. 2, 1958, Ser. No. 758,344

11 Claims. (Cl. 222—394)

The present invention relates to metering valves and especially to metering valves for dispensing pre-determined amounts of aerosol sprays produced through the aid of a low boiling propellant.

In the dispenser packaging industry, various liquids are stored under pressure for dispensing in the form of fine sprays, mists, or forms, commonly referred to as aerosols. These aerosols are of widely differing character and include, for example, insecticides, shaving lathers and pharmaceutical preparations for either topical application or inhalation therapy. In the dispensing of certain of these aerosols, such as perfumes and particularly those of a pharmaceutical character, it becomes desirable to be able to dispense measured doses with particular accuracy. Measuring valves are known in which a closure for a container contains a stationary measuring tank. A valve stem is slidable within the tank and is provided with orifices so that, on depression of the valve stem, liquid contained in the stationary measuring tank can be dispensed through the valve stem.

Many of these known measuring valves discharge on the downward or inward stroke, and the measuring tank fills on the upward or outward stroke. In such constructions, leakage or drainage from the measuring tank tends to produce an incomplete first discharge.

The present invention resides in the concept of a metering valve for dispensing measured volumes of fluid material from a container comprising a closure for closing the mouth of a container; a plunger extending through an aperture in the closure and reciprocably slidable therein, the plunger slidably and sealingly engaging the closure; a hollow measuring chamber formed within the plunger, an orifice extending through the plunger wall and capable of connecting the hollow measuring chamber with the reservoir of fluid material within the container; a hollow exit chamber formed within the plunger, an inlet extending through the plunger wall and connecting the hollow exit chamber to the exterior of the plunger; and means for moving the plunger within the aperture to a priming inner position where the orifice communicates with the reservoir of pressurized fluid material within the container and the pressurized fluid material flows through the orifice to fill the hollow measuring chamber; and means for moving the plunger within the aperture to an outer discharge position where both the orifice and inlet simultaneously communicate with a channel formed in the closure adjacent the plunger so that the pressurized measured charge of fluid material flows through the orifice, the channel, the inlet and the hollow exit chamber to the exterior of the container; whereby the fluid contents of the container are dispensed as a series of charges or puffs of uniform volume.

By employing a valve mechanism according to the invention, after a charge has been dispensed, no further pressurized fluid material will be dispensed until the valve is reactuated. Should the operater inadvertently depress the plunger to its priming inner position for a period longer than intended, only the same uniform volume of material will be dispensed and there will not be protracted discharge and waste of the material in the container.

It is thus a primary object of the invention to provide metering valve mechanism for dispensing a metered quantity only of a pressurized fluid material from a container on each actuation of the valve mechanism.

Another object of the invention is to provide a simplified construction for a metering valve which is durable, economical and dependable.

It is another object of this invention to provide a metering valve construction which may be used satisfactorily with a container in the erect or the inverted position.

Another object of this invention is to provide a metering valve construction which can be easily adapted for pressure filling.

It is a further object of the invention to provide a metering valve which makes possible the dispensing of smaller doses with more accuracy than is practicable by the use of the dispensing device involving a stationary measuring tank.

Another object of the invention is to provide a metering valve which enables substantially all of the contents of the container to be dispensed, eliminating the need for an auxiliary drainage device.

In the metering valve according to the invention, the pre-determined volume of the hollow measuring chamber in the plunger can be accurately selected or adjusted prior to assembly to any desired volume. In one embodiment of the invention, this can be done by forming the plunger from two telescoping tubular members that are adjusted until the hollow measuring chamber has the desired volume and then fixed with respect to each other. The outer telescoping member can have an out-turned flange serving as a stop to limit the outward movement of the plunger.

The plunger can have the shape of a cylinder. The term "cylinder" is used herein in its broad geometric sense, meaning a closed curved surface generated by a straight line moving so that it is always parallel to its first position and constantly touching a given curve.

A feature of the invention is the provision of sealing means at the aperture in the closure through which the plunger reciprocates and a channel so shaped and positioned as to provide a communicating path between the orifice and the inlet to the exit chamber.

Another feature of the invention resides in the location of the orifice so that at its inner priming position it is adjacent the top of the container, whereby the container when inverted can be fully emptied of its liquid content.

Other objects, features and advantages of the invention will appear to those skilled in the art from the following specification and claims, considered in conjunction with the accompanying drawings.

In the accompanying drawings, in which certain physical embodiments of the invention are shown for illustrative purposes:

Fig. 1 is a longitudinal section through a container and valve mechanism according to the present invention; showing the valve in the discharge position;

Fig. 2 is a detail transverse section taken on line 2—2 of Fig. 1;

Fig. 3 is a partial view similar to Fig. 1, but showing the valve in the priming position;

Fig. 4 is a longitudinal section through a container and valve mechanism illustrating an alternative form of the invention, showing the valve in the discharge position;

Fig. 5 is a partial longitudinal view of the container and valve shown in Fig. 4, showing the valve in the filling priming position.

Fig. 6 is a detail transverse section taken on line 6—6 of Fig. 4.

Fig. 7 is a partial longitudinal view through a container and valve mechanism illustrating another form of the invention, showing the valve in the discharge position; and Fig. 8 is a vertical view of the spring retaining member shown in Fig. 7.

Referring to Figs. 1, 3, 4, 5 and 7 of the drawings, a container 10 is adapted to hold liquid under pressure. The container 10 can be made of glass or plastic-coated glass, but other types of material can be used, including metal such as stainless steel. The aforesaid liquid comprises, generally, a propellant of the low-boiling type such as the various propellants sold under the trademark "Freon" and a material to be dispersed in aerosol form. A composite closure means indicated generally by the numeral 11 is disposed in the mouth of the container, sealing the same and affording control of the dispensing of the contents therefrom.

As shown in Fig. 1, the sealing means includes a sealing gasket 12 of resilient material seated on the lip 13 at the mouth of the container, an intermediate gasket 14 which can be of resilient or non-resilient material seated on the sealing gasket 12, and a sealing gasket 15 of resilient material seated on gasket 14. A closure cap 16 of metal or similar material encloses the gaskets 12, 14 and 15 and is tightly crimped about the lip 13 of the container to hold the closure parts firmly in place under pressure. The cap 16 has a flange 18 formed at its top.

The gaskets 12, 14 and 15 are provided with substantially circular cylindrical concentric registering bores forming an aperture extending through the closure. The bore in intermediate gasket 14 is of larger cross sectional area than the bores in sealing gaskets 12 and 15.

A plunger 20 is positioned in the aperture in closure 11 for sliding reciprocation therein. The plunger includes a hollow measuring chamber 22 formed in the lower portion, a stop 24 extending outwardly from the lower portion for engagement with the lower surface of gasket 12 to limit the upward movement of plunger 20, a hollow exit chamber 26 formed in the upper portion; a transverse wall 28 separating the hollow measuring chamber 22 and the hollow exit chamber 26; an abutment 30 extending outwardly from the upper end of the plunger 20; an orifice 32 extending through the plunger wall into the hollow measuring chamber 22; and an inlet 34 extending through the plunger wall into the hollow exit chamber 26.

A washer 36 encircles the plunger 20 and seats on the upper surface of gasket 15. A helical compression spring 38 encircles plunger 20 and engages washer 36 and abutment 30. The spring yieldingly urges the plunger 20 to the position shown in Figs. 1 and 4, wherein both the orifice 32 and the inlet 34 communicate with the channel 40 formed between the plunger 20 and the intermediate gasket 14. Thus, at all rotational positions of plunger 20 within the aperture in closure 11, there is a pathway for the passage of pressurized fluid material from hollow measuring chamber 22 through orifice 32, channel 40, inlet 34 and hollow exit chamber 26.

The upper open end of hollow exit chamber 26 is closed off by a suitable actuating button or applicator device (not shown) such as is described in United States Patent No. 2,746,796 to St. Germain. In Fig. 2, the dotted line indicates the outer perimeter of stop 24.

In operating the dispenser shown in Figs. 1 to 3, the container is inverted and the plunger is depressed by pressing upon the actuating button (not shown) at the top of the plunger, whereby the plunger is depressed to the position shown in Fig. 3. The spring 38 is so constructed and dimensioned that solid contact of the coils of the spring prevent the plunger from moving any farther into container 10 than is shown in Fig. 3. At this position the orifice 32 is in communication with the upper portion of container 10. Thus when the container is inverted, the last dreg of fluid material will drain into the hollow measuring chamber 22.

With the parts in the position shown in Fig. 3, the pressurized mixture of low-boiling propellant liquid and useful substance, such as a medicament, flows through orifice 32 into hollow measuring chamber 22. Thus the measuring chamber is primed with a measured charge of fluid material. In this priming position, the peripheral constriction of the gasket 12 against the transverse wall 28 seals the container against escape of the pressurized fluid. Thereafter, the downward pressure on spring 38 is released and the plunger moves upwardly to the position shown in Fig. 1 where the upward movement is limited by the stop 24 engaging gasket 12. At this position, the pressurized charge of mixture in measuring chamber 22 is discharged via orifice 32, channel 40, inlet 34 and exit chamber 26 to the exterior of the container. In this movement of the plunger 20 to discharging position, the contents of the main reservoir of fluid in container 10 will first be sealed against escape as the orifice 32 passes within the periphery of the gasket 12 and additionally sealed by stop 24 engaging the gasket 12 when the plunger 20 reaches the upper limit of its travel.

When it is desired to pressure fill the container 10, the spring 38 is removed and a charging nozzle is connected to the upper open end of exit chamber 26. Next, the plunger 20 is moved downward to a position where the inlet 34 extends beneath the gasket 12. The container is then readily charged by forcing the fluid material under pressure through the exit chamber 26 and the inlet 34 into the reservoir within the container 10. As soon as the container is charged, the plunger 20 is returned to the position of Fig. 1 and the spring 38 is attached.

In the showings of Figs. 4 to 8 certain of the parts correspond to those previously described and have reference characters applied thereto which correspond to those previously used.

In the embodiment of the invention of Figs. 4, 5 and 6, the changes in structure over that shown in the preceding figures and hereinabove described are in the plunger 42 and the intermediate gasket 44. In this form of the invention, the gasket 44 has a bore that is aligned for most of its periphery with the bores of gaskets 12 and 15, as seen in Fig. 6. The gasket 44 can be integral with one of the gaskets 12 and 15, if desired. A vertical longitudinal groove 45 is formed in the gasket 44. The plunger 42 includes an upper portion 46 having a hollow exit chamber 48 formed therein, an abutment 30 secured to its upper end, an annular groove or waist 50 formed therein having an inlet 52 extending through the groove, an annular groove or waist 54 having an orifice 56 extending through the groove, and a transverse wall 58 of resilient sealing material crimped in place by the grooves or waists 50 and 54. The plunger 42 is completed by a lower portion 60 constructed of a short length of tube closed at its lower end and having an out-turned flange 62 at its upper end serving as a stop to engage gasket 12 and limit the upward movement of plunger 42. Lower portion 60 can be sealed at any selected position on the upper portion 46 of plunger 42 to determine the volume of a hollow measuring chamber 64. The engagement of lower portion 60 with upper portion 46 can be made adjustable, as by screw threads, so that the volume of measuring chamber 64 can be readily adjusted.

As seen in Fig. 4, irrespective of rotation of the plunger 42, the orifice 56 will always be in communication with the inlet 52 via a pathway formed by the annular grooves 50 and 54 and the vertical groove 45.

In the embodiment of Figs. 7 and 8, the closure 11 for closing the mouth of container 10 includes an upper gasket 66 of resilient material and having a sealing lip 68 and a vertical cylindrical bore 70 of greater diameter than that of lip 68. A lower sealing gasket 72 is positioned below the upper gasket 66. A cage or spring retaining member 74 has an upper flange 76 positioned beneath the lower gasket 72. A resilient gasket 78 is positioned beneath the flange 76. A metal cap 80 clamps the closure parts together and is crimped around the lip 13 of container 10.

The cage 74 is preferably formed of metal and has four L-shaped bars 82 extending downwardly and inwardly from flange 76. A boss 83 connects the lower ends of the bars 82. The plunger 84 has an exit chamber 86, an inlet 88, a transverse wall 90, a hollow measuring chamber 91, an orifice 92, an enlarged portion 94 having an upper shoulder 96 and a lower shoulder 98, and a hollow guide portion 100 slidably engaging the boss 83. A helical compression spring 102 encircles the boss 83 and the guide portion 100. The spring engages the bars 82 and the lower shoulder 98 of enlarged portion 94 to yieldingly urge the plunger to the outer position shown in Fig. 7.

By inverting the container and depressing the plunger 84 in a manner similar to that previously described, the orifice 92 is exposed to the reservoir within the container 10 and the measuring chamber 91 fills with a charge of pressurized fluid material. Upon release of the plunger, the spring 102 returns the parts to the position shown in Fig. 7 where the pressurized charge of fluid material in measuring chamber 91 moves via orifice 92, bore 70, inlet 88, and exit chamber 86 to the exterior of the container.

The cage 74 can also serve to carry a dip-tube 104 so that this embodiment can be used in the erect position.

It will be seen that the present invention provides a metering valve wherein the hollow measuring chamber is primed on the downstroke thus ensuring an accurate full charge or dose of material on the first discharge. Further, it will be seen that when the device is used in the inverted position, the position of the orifice, as 32 in Fig. 1, in the priming position, viz., just below the gasket 12, ensures that the last dregs of the contents of the container can be expelled, thus avoiding waste.

Various other modifications in construction are obviously possible without departing from the essential concept of the invention and the invention is accordingly not limited to the specific details of the constructions shown and described hereinabove for purposes of illustration. All such modifications as properly fall within the scope of equivalency of the following claims are therefore intended to be covered.

I claim:

1. A metering valve for dispensing measured volumes of fluid material from a container comprising: a closure for closing the mouth of a container, said closure having an aperture formed therein extending between opposite surfaces of said closure; said closure having two spaced sealing portions having bores formed therein; an intermediate closure portion positioned between said sealing portions and having a bore formed therein of greater cross-sectional area than said bores in said sealing portions; said bores in said sealing portions and said bore in said intermediate closure portion registering to form said aperture; a plunger reciprocably positioned in said aperture with said intermediate closure portion forming a channel adjacent said plunger; said plunger sealingly and slidably engaging said sealing portions; said plunger having a hollow measuring chamber formed therein and an orifice extending between said hollow measuring chamber and the exterior of said plunger; said plunger having a hollow exit chamber formed therein and an inlet extending between said exit chamber and the exterior of said plunger; said orifice and inlet being no farther apart on the longitudinal axis of said plunger than the length of said channel in the direction of movement of said plunger so that the plunger can be moved to a position where both said orifice and said inlet simultaneously communicate with said channel; whereby said plunger can be pushed through said aperture to expose said orifice to the interior of the container with the subsequent filling of said hollow measuring chamber with a charge of fluid material, and said plunger can be moved in the opposite direction through said aperture to a position where said orifice and said inlet simultaneously communicate with said channel and a measured charge under pressure moves through said orifice, said channel and said inlet into said exit chamber.

2. A metering valve as set forth in claim 1 and including stop means for limiting the reciprocation of said plunger in said aperture so that the inlet to said exit chamber cannot be exposed to the interior of the container.

3. A metering valve as set forth in claim 1 and including an abutment secured to said plunger and extending outwardly therefrom; a compression spring encircling said plunger and engaging said abutment; said spring yieldingly pressing said plunger through said aperture outwardly from the interior of the container; said spring being so constructed and dimensioned that at maximum compression said orifice is exposed to the interior of the container but said inlet is not so exposed; and a stop secured to said plunger and extending laterally therefrom to engage the surface of said closure adjacent the interior of the container for limiting the outward movement of said plunger at a position where said orifice and said inlet simultaneously communicate with said channel.

4. A metering valve as set forth in claim 3 wherein said spring is so constructed and dimensioned that at maximum compression said orifice is exposed to the topmost portion of the interior of said container.

5. A metering valve for dispensing measured volumes of fluid material from a container comprising: a closure for closing the mouth of a container, said closure including two spaced substantially parallel resilient gaskets having registering bores formed therein, an intermediate closure portion positioned between and substantially-parallel to said gaskets, said intermediate closure portion having a bore formed therein of greater cross sectional area than said bores in said gaskets; said bores in said gaskets and said intermediate closure portion registering to form an aperture extending through said closure; a cylindrical plunger reciprocably positioned in said aperture with said intermediate closure portion forming a channel extending around the entire perimeter of said plunger; said plunger sealingly and slidably engaging said gaskets; said plunger having a hollow measuring chamber formed therein and extending into the interior of the container; a stop secured to said plunger and extending laterally therefrom adjacent said hollow measuring chamber for engagement with a gasket to limit the movement of said plunger outwardly through said aperture; said plunger having a hollow exit chamber formed therein; said plunger having a transverse wall separating said hollow measuring chamber and said hollow exit chamber; said plunger having an orifice extending therethrough adjacent said transverse wall from said hollow measuring chamber to the exterior of said plunger; said plunger having an inlet extending therethrough adjacent said transverse wall from said hollow exit chamber to the exterior of said plunger; said orifice and said inlet being no farther apart on the longitudinal axis of said plunger than the length of said channel in the direction of movement of said plunger so that the plunger can be moved to a position where both said orifice and said inlet simultaneously communicate with said channel; an abutment secured to said plunger and extending laterally therefrom at a position adjacent the outer end of said hollow exit chamber; a helical compression spring encircling said plunger and engaging said abutment to yieldingly urge said plunger to a position where said stop engages a gasket and said orifice and said inlet simultaneously communicate with said channel; said spring being so constructed and dimensioned that at maximum compression said orifice is exposed to the interior of the container but said inlet is not so exposed.

6. A metering valve as set forth in claim 5 wherein said plunger has a pair of annular inwardly-depressed grooves formed therein; said orifice and said inlet extending through the depressed portions of said grooves; and said channel extends around only a portion of the perimeter of said plunger.

7. A metering valve for dispensing measured volumes of fluid material from a container comprising: a closure assembly for the mouth of the container, said closure assembly including sealing means, said closure assembly including said sealing means having a passageway therethrough extending axially of the container; a plunger mounted for reciprocating sliding movement in said passageway, said plunger engaging said sealing means in sealing relation during the sliding movement of said plunger, said plunger having a hollow measuring chamber formed therein, said hollow measuring chamber being closed except for an orifice extending between said hollow measuring chmaber and the exterior of said plunger, said plunger having a hollow exit chamber and an inlet extending between said exit chamber and the exterior of said plunger; said closure assembly including a channel extending along the path of movement of said plunger for a portion of the length of said closure assembly axially of the container, said orifice and said inlet being no farther apart on the longitudinal axis of said plunger than the length of said channel in the direction of movement of said plunger, so that said plunger can be moved to a position in which both said orifice and said inlet simultaneously communicate with said channel; an apertured cage member secured to said closure and extending into the interior of the container; a boss secured to said cage member and extending toward said closure assembly; a guide portion extending from the inner end of said plunger and slidably engaging said boss; said plunger having an enlarged portion with a first shoulder adjacent said guide portion and a second shoulder for engagement with said closure assembly to limit the movement of said plunger outwardly through said passageway; and, a helical compression spring encircling said boss and said guide portion and engaging said cage and said first shoulder for yieldingly urging said plunger to a position where said second shoulder engages said closure assembly and both said orifice and said inlet simultaneously communicate with said channel, said spring being so constructed and dimensioned that at maximum compression said orifice is exposed to the interior of the container but said inlet is not so exposed.

8. A measuring valve for dispensing measured volumes of fluid material from a container comprising: a closure assembly for the mouth of the container, said closure assembly including sealing means, said closure assembly including said sealing means having a passageway therethrough extending axially of the container; a plunger mounted for reciprocating sliding movement in said passageway, said plunger engaging said sealing means in sealing relation during the sliding movement of said plunger, said plunger having a hollow measuring chamber formed therein, said hollow measuring chamber being closed except for an orifice extending between said hollow measuring chamber and the exterior of said plunger, said plunger having a hollow exit chamber and an inlet extending between said exit chamber and the exterior of said plunger; said closure assembly including a channel contiguous to and communicating with said passageway intermediate the length of said passageway, said orifice and said inlet being no farther apart on the longitudinal axis of said plunger than the length of said channel in the direction of movement of said plunger, so that said plunger can be moved to a position in which both said orifice and said inlet simultaneously communicate with said channel, and means for limiting the movement of said plunger toward the interior of the container whereby said orifice may be exposed to the interior of the container but said inlet may not be so exposed.

9. A measuring valve for dispensing measured volumes of fluid material from a container comprising: a closure assembly for the mouth of the container, said closure assembly including sealing means, said closure assembly including said sealing means having a passageway therethrough extending axially of the container; a plunger mounted for reciprocating sliding movement in said passageway, said plunger engaging said sealing means in sealing relation during the sliding movement of said plunger, said plunger having a hollow measuring chamber formed therein, said hollow measuring chamber being closed except for an orifice extending between said hollow measuring chamber and the exterior of said plunger, said plunger having a hollow exit chamber and an inlet extending between said exit chamber and the exterior of said plunger; said passageway having a portion of its length of increased cross sectional area to form a channel lying radially outwardly of said plunger, said orifice and said inlet being no farther apart on the longitudinal axis of said plunger than the length of said channel in the direction of movement of said plunger, so that said plunger can be moved to a position in which both said orifice and said inlet simultaneously communicate with said channel, and means for limiting the movement of said plunger toward the interior of the container whereby said orifice may be exposed to the interior of the container but said inlet may not be so exposed.

10. A measuring valve as defined in claim 9 in which said channel is positioned in said sealing means.

11. A metering valve as defined in claim 8 in which said plunger has a pair of annular inwardly-depressed grooves formed therein; said orifice and said inlet extending through the depressed portions of said grooves; and said channel extends around only a portion of the perimeter of said plunger.

References Cited in the file of this patent

UNITED STATES PATENTS

| | | |
|---|---|---|
| 2,812,884 | Ward | Nov. 12, 1957 |
| 2,837,249 | Meshberg | June 3, 1958 |
| 2,858,053 | Weldherr | Oct. 28, 1958 |